Oct. 20, 1959  W. A. DERR ET AL  2,909,707
CIRCUIT BREAKER CONTROL SYSTEMS USING LOGIC DECISION ELEMENTS
Filed Dec. 13, 1955  3 Sheets-Sheet 1

WITNESSES
Leon J. Taga
F. V. Giolma

INVENTORS
Willard A. Derr and
Edward J. Cham
BY
Ralph H. Swingle
ATTORNEY

United States Patent Office 2,909,707
Patented Oct. 20, 1959

2,909,707

CIRCUIT BREAKER CONTROL SYSTEMS USING LOGIC DECISION ELEMENTS

Willard A. Derr, Pittsburgh, and Edward J. Cham, Penn Township, Westmoreland County, Pa., assignors to Westinghouse Electric Corporation, East Pittsburgh, Pa., a corporation of Pennsylvania Application December 13, 1955, Serial No. 552,810

16 Claims. (Cl. 317—22)

Our invention relates generally to circuit breaker control systems and has reference in particular to circuit breaker control systems utilizing static logic decision elements.

Generally stated, it is an object of our invention to provide circuit breaker control systems that are simple and inexpensive to manufacture and which are reliable and effective in operation.

More specifically, it is an object of our invention to provide in a circuit breaker control system for utilizing static logic decision elements in place of the customary relays.

Another object of our invention is to provide in a circuit breaker control system for using a combination of static Flip-Flop elements and an And element for closing a circuit breaker.

Yet, another object of our invention is to provide in a reclosing circuit breaker control system for using static logic decision elements for closing the circuit breaker and for effecting reclosure thereof after it opens in response to a fault condition.

It is also an object of our invention to provide in a circuit breaker control system for using logic decision elements for reclosing a circuit breaker when it opens in response to a fault condition, but only if the breaker has remained closed for a predetermined time.

Other objects will, in part, be obvious and will, in part, be explained hereinafter.

As used in the following description, a Flip-Flop is a static circuit element which produces an output in response to one input, and maintains such output even though the input is removed. Reset or termination of the output is effected by a change in condition of a second input. An Or element is a circuit which has an output dependent on any one of a plurality of inputs. An And element has an output dependent on simultaneous existence of all of a plurality of inputs. A Delay element is a static circuit element which has an output a predetermined time after an input signal is applied.

In practicing our invention in accordance with one of its embodiments, a Flip-Flop logic decision element is used to selectively apply a voltage to an amplifier for closing a circuit breaker. The Flip-Flop element is a bistable element triggered by an And circuit which requires simultaneous energization of a plurality of input circuits to obtain an output, and which, in turn, is triggered from a control switch and another Flip-Flop. Normally open contacts of the circuit breaker apply signals to the off terminals of the Flip-Flop circuits to render them non-conductive, while an on signal for the second mentioned Flip-Flop element is provided through normally closed contacts of the breaker and normally closed contacts of the control switch.

For a more complete understanding of the nature and scope of our invention, reference may be made to the following detailed description which may be read in connection with the accompanying drawings, in which.

Figure 1:
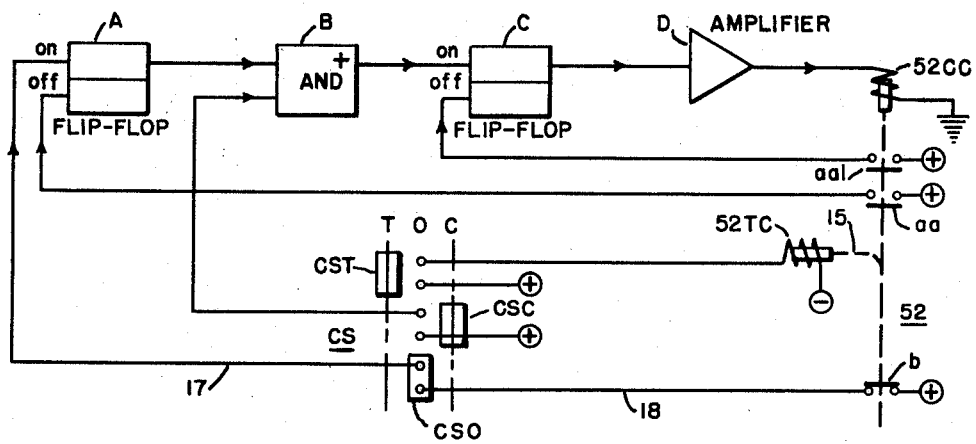
Figure 1 is a block diagram of a circuit breaker control system embodying the invention in one of its forms.

Referring to Fig. 1, which discloses what is called an X—Y closing circuit, a reference numeral 52 denotes generally a circuit breaker shown in the open position, and having a closing coil 52CC and a trip coil 52TC for actuating trip means 15 to open the circuit breaker. Energization of the closing coil 52CC is effected through an amplifier D which is controlled by a bistable Flip-Flop memory element C. The Flip-Flop memory element C is rendered conductive by the application of a signal to its on terminal from an And element B. Signals are applied to the And element B, both from a close contact CS—C of a control switch CS used to close or trip the circuit breaker, which is of a well known type manually operated and spring returned to the off position as shown, when released, and from an additional Flip-Flop element A which is rendered conductive by a circuit extending through conductor 17, the off contact CS—O of the control switch CS, conductor 18 and a normally closed contact $b$ of the circuit breaker 52. A normally open breaker mechanism contact member $aa$ is used to apply a signal to the off terminal of the Flip-Flop element A to render it non-conductive when the circuit breaker is closed, while another contact member $aa1$ applies a voltage to the off terminal of Flip-Flop C.

Figure 3:
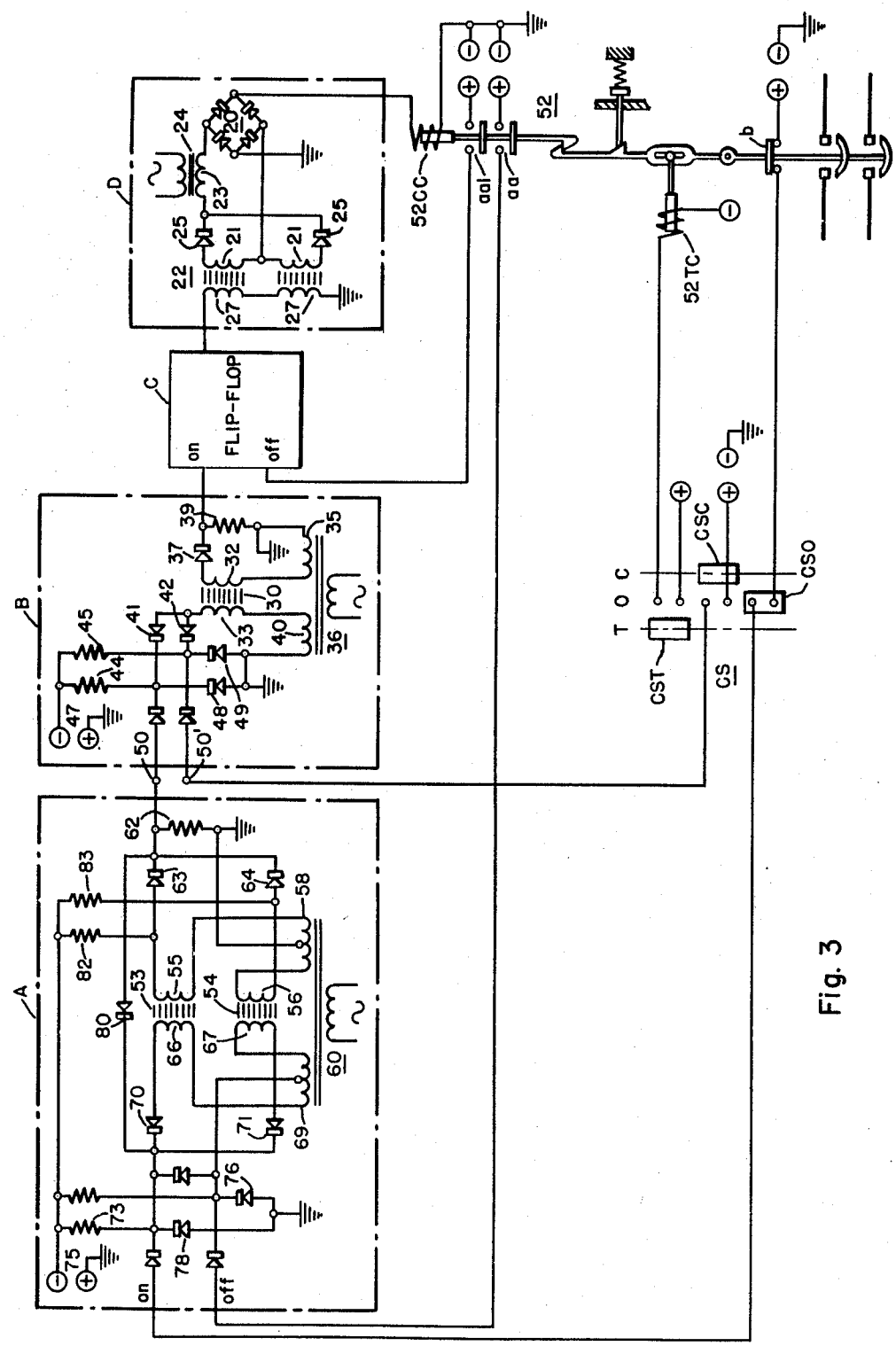
Fig. 3 is a schematic diagram of the circuit breaker control system shown in Fig. 1.

Referring to Fig. 3 of the drawing, it will be seen that the closing coil 52CC of the circuit breaker 52 is energized from the output circuit of the magnetic amplifier D, being connected to the output circuit of a rectifier bridge circuit 20 connected to load windings 21 of a saturable core element 22 in circuit with the secondary winding 23 of a transformer 24, which is connected to an alternating current source. Rectifiers 25 in circuit with the windings 21 provide for unidirectional energization of these windings. The control windings 27 of the magnetic amplifier are connected to be energized from the Flip-Flop element C. Since the Flip-Flop elements A and C may be identical, only the Flip-Flop memory element A has been shown in detail, and it will be described hereinafter. The off terminal of the Flip-Flop element C is connected to a source of electrical energy through a normally open contact $aa1$ of circuit breaker 52, so that the Flip-Flop element will be rendered non-conductive when the circuit breaker 52 is closed. The on terminal of the Flip-Flop element C is energized from the And element B.

The And element B may comprise a saturable core element 30 having an output winding 32 and a reset winding 33. The output winding 32 is connected in circuit with a secondary winding 35 of a transformer 36, a rectifier device 37 and a load resistor 39, so as to provide for positive saturation of core element 30 and energization of the load resistor on alternate half cycles during the gating period of the element B. The reset winding 33 is connected in circuit with a secondary winding 40 of the transformer 36, a pair of rectifier devices 41 and 42 arranged in parallel circuit relation, resistors 44 and 45, respectively, and a direct-current bias source 47. The bias source 47 is arranged to normally circulate a direct current through rectifier devices 48 and 49, which, together with the resistors 44 and 45 and the source 47, comprise a non-linear impedance. The secondary winding 40 is arranged to normally cause a reset current to flow through the reset winding 33 on alternate half cycles for resetting the magnetic flux in the core 30 to a negative value, thereby preventing the secondary winding 35 from causing any substantial current to flow in the load resistor 39. Input terminals 50 and 50' are provided, which are connected between the resistor 44 and rectifier 48, and the resistor 45 and the rectifier 49, respectively, for the purpose of introducing blocking voltages to prevent the flow of reset current. When such blocking voltages are applied and reset is prevented, the output winding 32 of the element will be effective to cause substantial current to flow through the load resistor 39 after the flux in the core 30 has been driven to a positive value. The application of blocking voltages to only one or the other of the terminals 50 and 50' will prevent gating of the element, since reset current may flow through the circuit which is not blocked. The application of blocking voltages to both of the terminals 50 and 50', blocks both reset circuits and permits gating of the element so as to produce an output voltage across the load resistor 39.

The And element B is controlled by applying a voltage to the terminal 50' through contact CS—C of the control switch CS by operating the switch to the close position, thus connecting the terminal 50' to the positive terminal of a direct-current source. A control voltage is applied to the terminal 50 from the Flip-Flop element A which is substantially identical with that described in application Serial No. 511,506 of Robert A. Ramey and William G. Hall, filed on May 27, 1955 and now Patent No. 2,792,564.

This element comprises magnetic cores 53 and 54 having output or gating windings 55 and 56 which are connected in circuit with adjacent sections of a secondary winding 58 of a transformer 60 to a load resistor 62, through rectifier devices 63 and 64 which provide for positive saturation of the core and conduction on alternate half cycles. The cores 53 and 54 are provided with reset windings 66 and 67 which are connected in a reset circuit with adjacent sections of a secondary winding 69 of the transformer 60 through rectifier devices 70 and 71, resistor 73, a direct-current source 75 and a rectifier device 76 back to the center connection of the secondary winding to provide for resetting the flux in cores 53 and 54 to a negative value. A blocking rectifier 78 connected in circuit with the resistor 73 and a source 75, provides a non-linear impedance circuit for protecting the reset windings 66 and 67. In order to improve the performance of the Flip-Flop element, a feed-back circuit is provided including a rectifier device 80 connecting the output circuit to the reset circuit so as to provide for maintaining the Flip-Flop element conducting when a voltage has once been applied to the on terminal. Resistors 82 and 83 connecting the output windings 55 and 56 to the source 75 provide a memory circuit which helps in storing a signal.

The on terminal of the Flip-Flop element A is connected to a source of electrical energy through the off contact CS—O of the control switch CS, through a normally closed contact b of the circuit breaker 52, which is closed when the circuit breaker is open. The off terminal of the Flip-Flop element A is connected to a source of electrical energy through contact aa of the circuit breaker mechanism, which is closed when the circuit breaker is closed, so as to provide for turning the Flip-Flop element off whenever the breaker mechanism closes.

With the circuit breaker in the open position, as shown, and the control switch CS in the off position, the on terminal of the Flip-Flop element A is connected to a direct-current source through contact CS—O so that the Flip-Flop element applies a signal voltage to the load resistor 62 and the terminal 50 of the And element B. Since no blocking voltage is applied to the terminal 50' of the element B, the And element has no output. By operating the control switch CS to the closed position, a voltage is applied through contact CS—C to terminal 50' of the element B also, thus blocking reset and producing an output voltage across the load resistor 39 which is applied to the on terminal of a Flip-Flop element C. This element applies the signal to the magnetic amplifier D to effect energization of the closing coil 52CC, causing the circuit breaker 52 to close. When the circuit breaker closes, contact b opens, removing the signal voltage from the on terminal of element A. At the same time, contact members aa1 and aa close, and apply control voltages to the off terminals of the Flip-Flop elements A and C, rendering them non-conductive. Accordingly, the input voltage to the magnetic amplifier is removed and the closing coil 52CC is deenergized, regardless of whether the control switch CS is held in the closed position.

Figure 2:
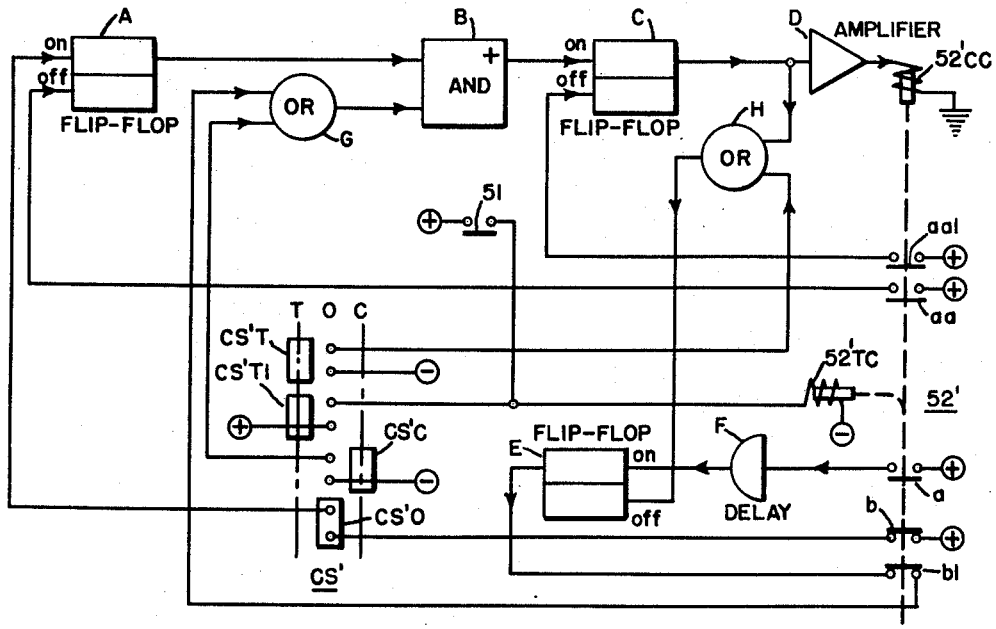
Fig. 2 is a block diagram of a reclosing circuit breaker system embodying the invention in another of its forms.

Referring to Fig. 2, it will be seen that the closing coil 52CC of a circuit breaker 52, which is to be automatically reclosed when it opens in response to a fault condition by the operation of a fault relay represented by the switch 51, is shown as energized from an amplifier D. This amplifier obtains energization from a Flip-Flop element C operating under the control of an And element B and a Flip-Flop element A in a manner similar to that described in connection with the circuit breaker of Fig. 1. In the present case, however, the And element B obtains further energization through an Or element G which is energized both from a control switch CS' and from an additional Flip-Flop element E, which is rendered conductive through a Delay circuit F controlled by normally open contacts a of the circuit breaker 52, and is deenergized from an additional Or circuit H which receives signals both from the Flip-Flop element C and from the control switch CS' through the trip contact CS'T.

Figure 4:
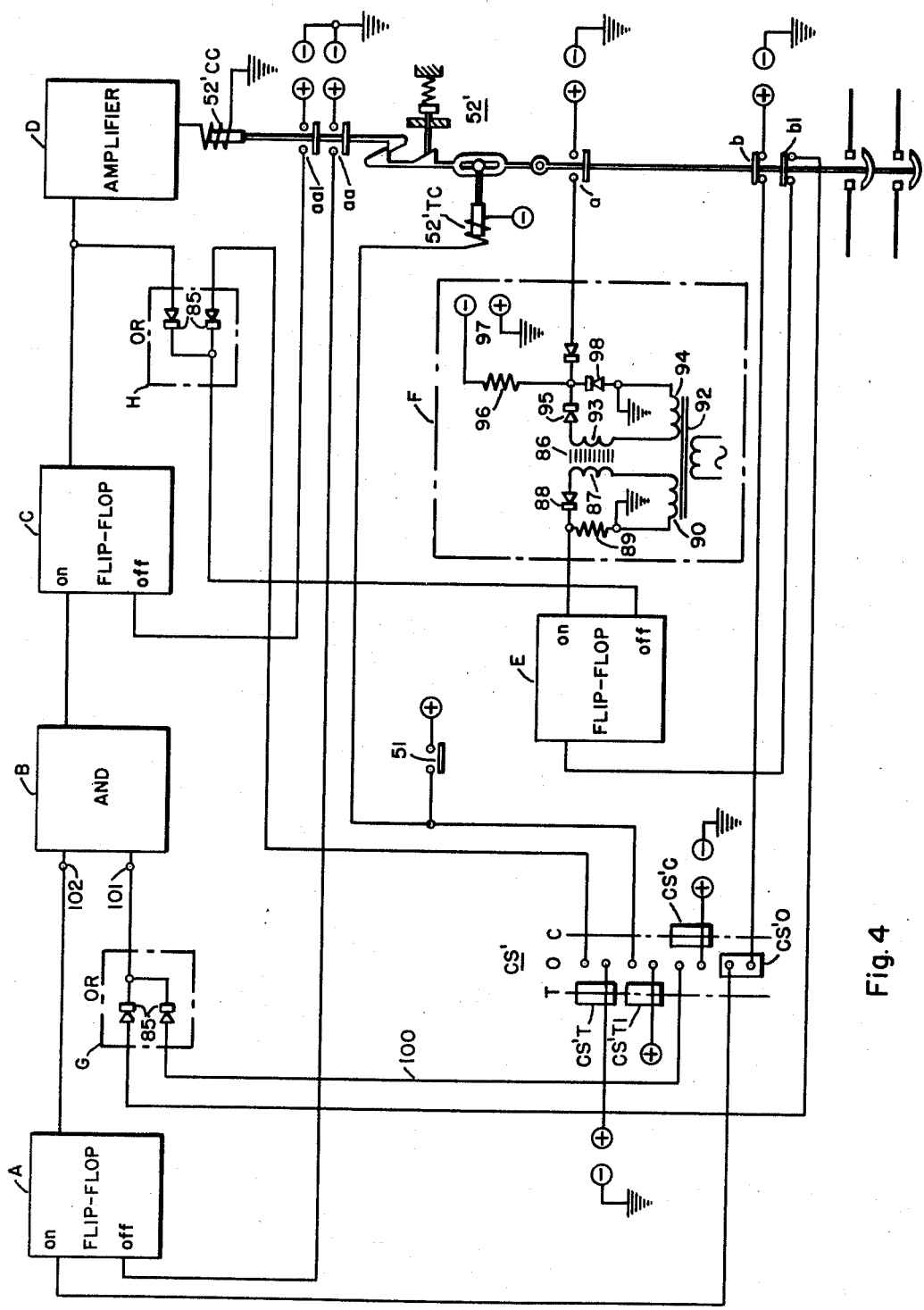
Fig. 4 is a partial block and schematic diagram of the reclosing circuit breaker system shown in Fig. 2.

Referring to Fig. 4, it will be seen that the Flip-Flop elements A, C and E are shown in block form, since they may be identical with that described in connection with the circuit breaker system of Fig. 3. The And element B may also be identical with the And element B of Fig. 3, as may the magnetic amplifier D be identical with element D of Fig. 3. The Or circuits G and H comprise parallel input connections of rectifier devices 85 which permit an output signal in response to an input signal on either core of the rectifier devices.

The Delay element F comprises a magnetic core 86 having an output or gating winding 87 connected in circuit with a rectifier device 88, a load resistor 89, and the secondary winding 90 of a transformer 92 for effecting positive saturation of core 86 to reduce the impedance of winding 87. The core 86 is provided with a reset winding 93 connected in circuit with an additional secondary winding 94, a rectifier device 95, resistor 96 and a direct-current source 97 to provide a reset circuit for restoring the magnetic flux of the core to a negative value so as to increase the impedance of winding 87 and prevent gating. A rectifier device 98 provides in conjunction with the resistor 96 and source 97 a non-linear impedance for protecting the reset winding 93. The output winding 87 is preferably designed so that it requires several consecutive half cycles of gating to produce an output, that is, to effect saturation of the core 86. Thus, so long as reset is not effected, there will be a delay of several half cycles during which a signal is applied to the reset winding, before any output is obtained from the Delay element F.

With the circuit breaker in the open position, as shown, closure is effected by operating the control switch CS' to the close position so that contact CS'C applies a control voltage to the Or element G through conductor 100. The signal is applied to the terminal 101 of the And element B. A control voltage is already applied to terminal 102 of the And element B from the Flip-Flop element A, since the control switch CS' in the off position and the circuit breaker 52' open, a control voltage is applied to the on terminal of the Flip-Flop element A through contacts CS'C and b. The And element B is therefore rendered conductive and applies a control voltage to the on terminal of the Flip-Flop element C, the output of which is applied to the amplifier D to effect energization of the closing coil 52'CC.

When the circuit breaker 52' closes, a control voltage is applied to the Delay circuit F through contact member a. Should the circuit breaker remain closed for a predetermined time, sufficient for the output winding 87 of the Delay element to effect saturation of the core 86 through repeated energizations, a signal will be applied to the on terminal of the Flip-Flop element E. Should the circuit breaker open as a result of operation of fault responsive contact 51 before the time Delay element F obtains an output, the Flip-Flop element E will remain in the off condition, since a voltage is applied to its off terminal from the Or element H when the Flip-Flop element C was rendered conductive to close the breaker. The Flip-Flop element C is rendered non-conductive as is the Flip-Flop element A, through the application of control voltages of the off terminals through contacts aa1 and aa of the circuit breaker.

If the circuit breaker remains closed for sufficient time for the Delay element F to obtain an output, the Flip-Flop element E will be rendered conductive. As soon as the circuit breaker opens, a control voltage is applied by the Flip-Flop element E through contact b1 of the circuit breaker to the Or element G and the terminal 101 of the And element B. Since the circuit breaker is open, a control voltage is applied to the on terminal of the Flip-Flop element A through contact CS'O of the control switch and contact 10d of the circuit breaker. Thus, a control voltage is also applied to the terminal 102 of the And element B. Accordingly, the And element applies an output voltage to the on terminal of the Flip-Flop element C whose output is amplified by the amplifier 10 to effect energization of the closing coil 52'CC to close the breaker. The Flip-Flop elements C and A are rendered non-conductive through voltages applied to their off terminals through contacts aa1 and aa of the circuit breaker when it closes.

Should the breaker be tripped by operating switch CS' to the "trip" position, a control voltage is applied to the Or element H through contact CS'T1, producing an output which is applied to the off terminal of Flip-Flop E to render it non-conductive and prevent reclosing.

From the above description and the accompanying drawings, it will be apparent that we have provided in a simple and effective manner for controlling the operation of circuit breakers through the use of static decision elements. Control systems utilizing the features of our invention provide reliable control circuits having a minimum of moving parts so as to provide for the maximum continuity of service. Control circuits embodying the features of our invention may utilize completely enclosed or hermetically sealed elements which are unaffected by moisture and temperature, and are compact and simple to use.

Since certain changes may be made in the above-described construction, and different embodiments of the invention may be made without departing from the spirit or scope thereof, it is intended that all the matter contained in the above description or shown in the accompanying drawings shall be considered as illustrative and not in a limiting sense.

We claim as our invention:

1. In combination, a circuit breaker having a closing coil and auxiliary contacts, a Flip-Flop element controlling energization of the closing coil, means controlling the Flip-Flop element including another Flip-Flop element, and means including a control switch and said auxiliary contacts controlling said another Flip-Flop element.

2. A control system for a circuit breaker having a closing coil and auxiliary contacts normally open and normally closed comprising, a Flip-Flop controlling energization of the closing coil, means controlling the Flip-Flop including an And element and a circuit including a normally open breaker auxiliary contact, an additional Flip-Flop controlling the And element, and means including a switch with normally open and normally closed contacts controlling the additional Flip-Flop and the And element.

3. A circuit breaker control system for a circuit breaker having a closing coil and auxiliary contacts which are respectively normally open and normally closed comprising, a Flip-Flop controlling energization of the closing coil, means for triggering said Flip-Flop including an And element and a normally open auxiliary contact, a control switch having normally open and normally closed contacts, means for triggering said And element including another Flip-Flop and a normally open switch contact, and means for triggering said another Flip-Flop including a circuit having a normally closed switch contact and a normally closed auxiliary contact and another circuit having a normally open auxiliary contact.

4. The combination with a circuit breaker having a closing coil, of a control switch, a Flip-Flop selectively responsive to the positions of the circuit breaker and the control switch, an And circuit element responsive to the position of the control switch and the condition of said Flip-Flop, and means effecting energization of said closing coil including an additional Flip-Flop selectively responsive to the position of the breaker and the condition of said And circuit element.

5. A reclosing breaker system comprising, a circuit breaker having a closing coil, a Flip-Flop for effecting energization of said coil, an And circuit element connected to control said Flip-Flop, means for controlling said And circuit element including a second Flip-Flop and a control switch, and additional means for controlling said And circuit element independently of said second Flip-Flop, said additional means comprising an Or circuit element controlled by said control switch and a third Flip-Flop in accordance with the breaker position, and time delay means for controlling said third Flip-Flop in accordance with predetermined operation of the circuit breaker.

6. A control system for a circuit breaker having a closing coil and a plurality of normally open auxiliary contacts and normally closed auxiliary contacts, a control switch having normally open and normally closed contacts, means including a Flip-Flop for effecting energization of the closing coil, circuit means including normally open auxiliary breaker contacts applying a blocking voltage to the Flip-Flop, an And circuit element connected to apply a triggering voltage to the Flip-Flop, means including an additional Flip-Flop applying a triggering voltage to the And circuit element, an Or circuit element connected to apply a triggering voltage to the And circuit element, means including normally open contacts of the control switch and another Flip-Flop connected to apply triggering voltages to the Or circuit element, means including a delay circuit and normally open breaker auxiliary contacts applying a triggering voltage to said another Flip-Flop, an additional Or circuit element connected to apply a blocking voltage to said another Flip-Flop, and means applying triggering voltages to the additional Or circuit element from the first-mentioned Flip-Flop and through normally open contacts of the control switch.

7. In a control system for a circuit breaker, bistable means responsive to opening of the breaker for producing a continuing signal, additional bistable means responsive to said signal for producing a signal for effecting closing of the breaker, and means including a contact responsive to closing of the breaker to apply a signal to said bistable means to terminate production of said signals.

8. In a control system for a circuit breaker, bistable means operable in response to a signal to produce a continuing output signal, a control switch, means jointly responsive to said signal and operation of the control switch to produce another output signal, bistable means selectively responsive to said another output signal and operation of the breaker to control closing of the breaker.

9. In a control system for a circuit breaker having a closing coil, means operable in response to a signal to provide an output signal for effecting energization of the closing coil, additional means responsive to a signal to apply a signal to the first mentioned means, means including a control switch for applying a signal to the additional means, another means responsive to a signal to apply a signal to the first-mentioned means, and means including a delay device for applying a signal to said another means a predetermined time after the breaker closes.

10. In a control circuit for a circuit breaker having a closing coil, a first magnetic core means having gating windings thereon to effect energization of the closing coil, and reset windings on the core means to increase the impedance of the gating windings to block gating, means including a second magnetic means having a gating winding thereon for effecting application of a control voltage to the reset winding of the first-mentioned core means to effect gating of the gating winding thereof, and a reset winding operable to block gating, and means including a control switch for applying a control signal to the reset winding of the second mentioned core means to effect gating of the gating winding thereof.

11. A control circuit for a circuit breaker having a closing coil comprising, magnetic core means having a gating winding for producing a voltage to effect energization of the closing coil and an opposing reset winding for increasing the impedance of the gating winding, additional magnetic core means having a gating winding connected to apply a blocking voltage to the reset winding of the first-mentioned core means and an opposing reset winding with a pair of reset circuits, another magnetic core means having a gating winding connected to apply a signal to one of the reset circuits of said pair, and a reset winding with a single reset circuit, a control switch operable to apply a blocking voltage to said single reset circuit, yet another magnetic core means having a gating winding for applying a blocking voltage to the other reset circuit of said pair and having itself a reset winding for blocking gating; delay means having a magnetic core with a gating winding connected to apply a blocking voltage to the reset winding of said yet another magnetic core means when the breaker opens and a reset winding; and circuit means applying a blocking voltage to said last-mentioned reset winding a predetermined time after the breaker closes.

12. A control system for a circuit breaker having a closing coil and auxiliary control means normally effective and normally ineffective responsive to energization of the coil and comprising, a Flip-Flop controlling energization of the closing coil, means controlling the Flip-Flop including an And element and a circuit including a normally ineffective breaker auxiliary control means, an additional Flip-Flop controlling the And element, and means including a control device with normally ineffective and normally effective control means controlling the additional Flip-Flop and the And element.

13. A circuit breaker control system for a circuit breaker having a closing coil and auxiliary control means respectively normally effective and normally ineffective responsive to energization of the coil comprising, a Flip-Flop controlling energization of the closing coil, means for triggering said Flip-Flop including an And element and a normally ineffective auxiliary control means, a control device having normally ineffective and normally effective control means, means for triggering said And element including another Flip-Flop and a normally ineffective control device control means, and means for triggering said another Flip-Flop including a circuit having a normally effective control device control means and a normally effective auxiliary control means and another circuit having a normally ineffective auxiliary control means.

14. The combination with a circuit breaker having a closing coil, of a control device, a Flip-Flop selectively responsive to the positions of the circuit breaker and the control device, an And circuit element responsive to the position of the control device and the condition of said Flip-Flop, and means effecting energization of said closing coil including an additional Flip-Flop selectively responsive to the position of the breaker and the condition of said And circuit element.

15. In a control circuit for a circuit breaker having a closing coil, a first magnetic core means having gating windings thereon to effect energization of the closing coil, and reset windings on the core means to increase the impedance of the gating windings to block gating, means including a second magnetic means having a gating winding thereon for effecting application of a control voltage to the reset winding of the first-mentioned core means to effect gating of the gating winding thereof, and a reset winding operable to block gating, and means including a control device for applying a control signal to the reset winding of the second mentioned core means to effect gating of the gating winding thereof.

16. A control circuit for a circuit breaker having a closing coil comprising, magnetic core means having a gating winding for producing a voltage to effect energization of the closing coil and an opposing reset winding for increasing the impedance of the gating winding, additional magnetic core means having a gating winding connected to apply a blocking voltage to the reset winding of the first-mentioned core means and an opposing reset winding with a pair of reset circuits, another magnetic core means having a gating winding connected to apply a signal to one of the reset circuits of said pair, and a reset winding with a single reset circuit, a control device operable to apply a blocking voltage to said single reset circuit, yet another magnetic core means having a gating winding for applying a blocking voltage to the other reset circuit of said pair and having itself a reset winding for blocking gating; delay means having a magnetic core with a gating winding connected to apply a blocking voltage to the reset winding of said yet another magnetic core means when the breaker opens and a reset winding; and circuit means applying a blocking voltage to said last-mentioned reset winding a predetermined time after the breaker closes.

References Cited in the file of this patent

UNITED STATES PATENTS 2,614,213    Tynan    Oct. 14, 1952